UNITED STATES PATENT OFFICE.

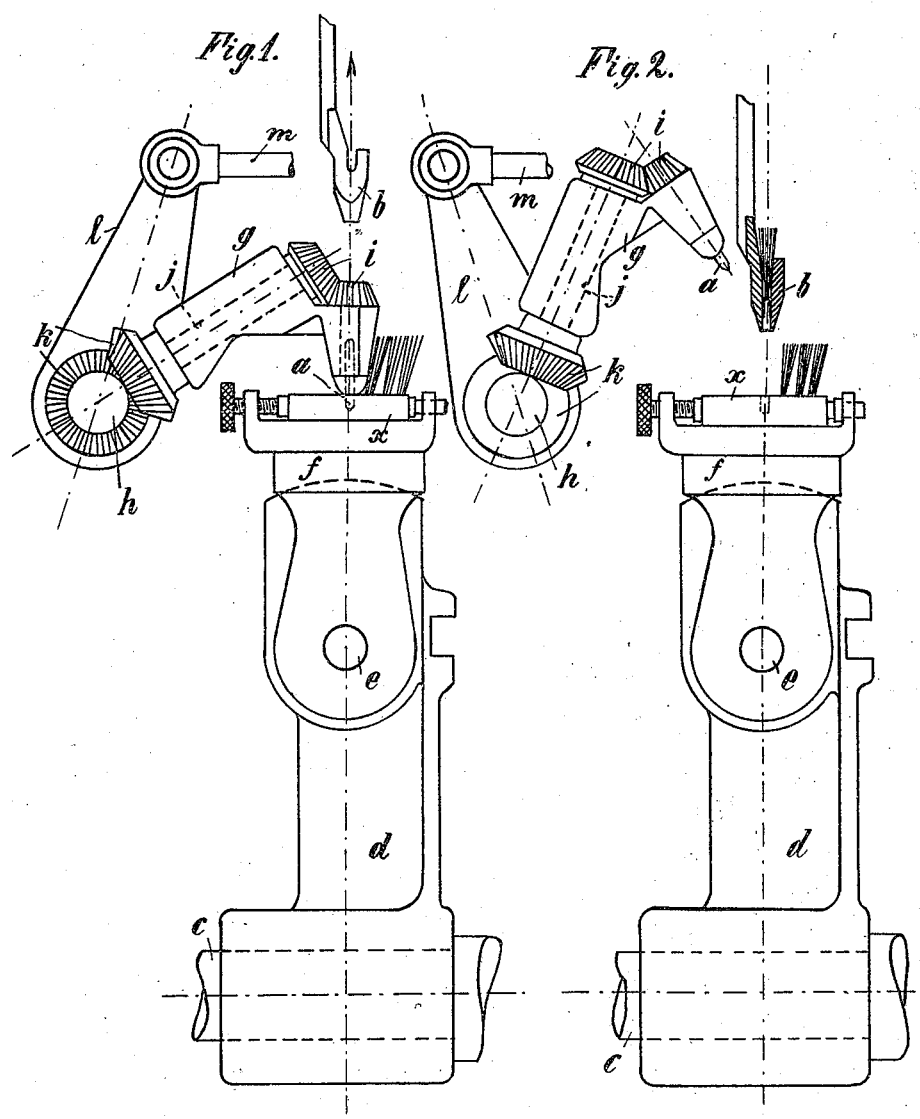

GEORG HENNING, OF BERGEDORF, NEAR HAMBURG, GERMANY.

BORING AND STUFFING MACHINE FOR BROOM AND BRUSH HEADS.

1,426,382.　　　　Specification of Letters Patent.　　Patented Aug. 22, 1922.

Application filed September 28, 1920. Serial No. 413,380.

*To all whom it may concern:*

Be it known that I, GEORG HENNING, a citizen of the German Republic, residing at Bergedorf, near Hamburg, Germany, have invented certain new and useful Improvements in Boring and Stuffing Machines for Broom and Brush Heads, of which the following is a specification.

This invention relates to boring- and stuffing-machines for broom- and brush-heads of that type in which the boring device and the stuffing device work together with one and the same workpiece support. With machines of this type the boring device is arranged so that it can be oscillated to adjust the drill in the axial working direction of the stuffing tool, the drill moving parallel to this working direction. With such an arrangement of the boring device the stuffing tool can advance only when the boring device, which oscillates transversely with regard to the axis of the stuffing tool, has moved far enough away from the path of the stuffing tool, from which there results at each boring- and stuffing-operation a loss of time which repeats itself continuously and which causes a considerable decrease of efficiency of the machine. Owing to the parallel movement of the drill the back play, which is unavoidable with the movement of the oscillating arm which carries the drill, is transferred in being increased to the adjustment of the drill so that the said drill is adjusted outside the working direction of the stuffing tool.

The machine constructed according to this invention is free from both these defects so that the stuffing tool can advance simultaneously with the oscillation of the drill out of its working position and that the back play in the boring device makes itself felt only in the working direction of the drill in a harmless manner. The efficiency of the machine is thus increased and a correct co-operation of the drill and the stuffing tool is ensured. This object is attained, according to the invention, through arranging the boring device so that it can oscillate in a plane which is situated parallel to the working direction of the stuffing tool, this working direction being situated in the said plane. At a determined position of the axis of rotation of the boring device the part of the said device which carries the drill moves out of the path of the stuffing tool with such speed that the stuffing tool can advance at the same time. The back play produced during the movement of the boring device can produce a displacement of the drill only in the direction of the axis of the drill but not perpendicular to this direction so that the drill bores at exactly the same point of the brush head at which the stuffing tool will work afterwards.

It is evident that the boring device can be fixed and the stuffing device can oscillate.

The invention is diagrammatically shown in the accompanying drawing, by way of example, in its application to two different boring- and stuffing-machines. The drawing shows only those parts of the machine which are absolutely necessary to make the invention understood.

Figs. 1 and 2 show the improvements in connection with a machine with a horizontal workpiece.

Figure 3:
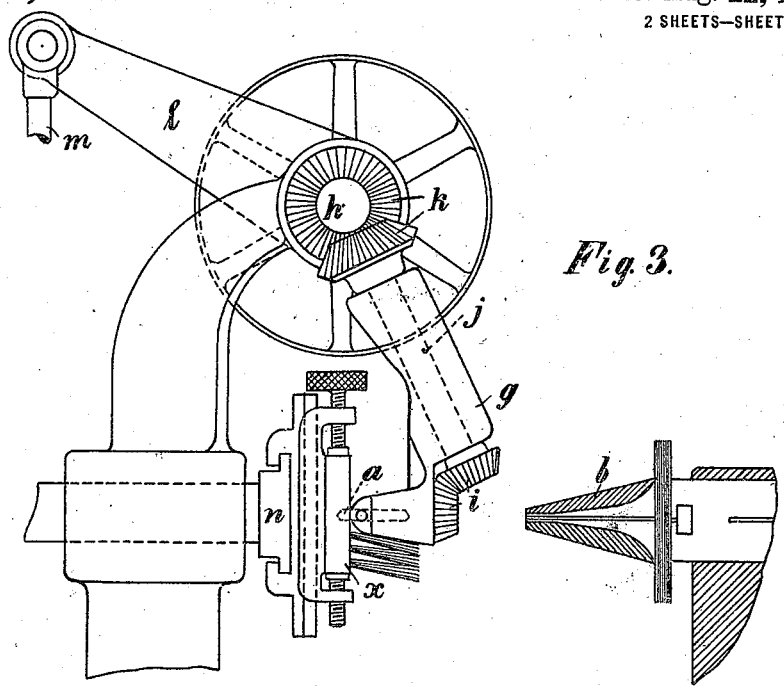
Figs. 3 and 4 show the improvements in connection with a machine with upright workpiece moved towards the fixed stuffing device.

In all figures $a$ is the boring tool and $b$ is the stuffing tool. In the machine illustrated by Figs. 1 and 2 the support, which carries the horizontal workpiece $x$, consists of a holder $d$ pivotally mounted upon pin $c$ and of a table $f$ adapted to oscillate around two lateral studs $e$ and provided with a clamping device for the workpiece $x$. The holder $d$ and the table $f$ oscillate in planes which intersect one another at right angles. The workpiece is displaced continuously in the direction of its longitudinal axis through the oscillations of the holder $d$ and in transverse direction through the oscillation of the table $f$ (which takes place in the plane of the drawing) and by means of mechanisms which are not shown in the drawing.

The stuffing tool $b$ executes above the work piece $x$ a reciprocating movement in vertical direction, the line of movement standing perpendicular to the axis of the studs $e$ and the axis of the pin $c$. The boring tool $a$ can be adjusted so that it is situated in this line of movement of the stuffing tool $b$ and consequently comes in contact with the work piece $x$ at exactly the same point as the stuffing tool $b$. With this object in view the boring device consists of an oscillating arm $g$ adapted to turn around a shaft $h$ mounted in the machine, said arm carrying the drill $a$ in an extension of its free end which is bent downwards at an acute angle. The drill $a$ is revolved from the shaft $j$ located in the oscillating arm $g$ with the aid of the bevel wheels $i$, the shaft $j$ being operated from the shaft $h$ by means of the bevel wheels $k$ mounted upon said shafts $j$ and $h$ and meshing the one with the other. A lever $l$ rigidly connected with the oscillating arm $g$ is operated by means of a connecting rod $m$ driven from the machine.

The shaft $h$ is mounted in such a manner, that the oscillating arm $g$ can be swung upwards from the position shown in Fig. 1, in which the drill $a$ stands in line with that point of the workpiece $x$ at which the stuffing tool $b$ will work afterwards, so that the path to the workpiece is made free for the stuffing tool (Fig. 2).

The oscillating arm $g$ is moved from the machine through the intermediary of the connecting rod $m$ in such a manner that, after the workpiece $x$ has been adjusted through the feed motion of the workpiece support $d$, $f$, the stuffing tool being in the upper position, the drill $a$ is lowered upon the workpiece to be raised again after the hole has been bored. The stuffing tool $b$ is now operated to insert the bristles into the hole which has just been bored, to be raised again, whereupon the workpiece can be moved to the next following position. The movement of the stuffing tool takes place in a line which is tangential to the arc described by the cutting end of the drill at the precise point where the latter engages the surface of the brush back.

Figure 4:
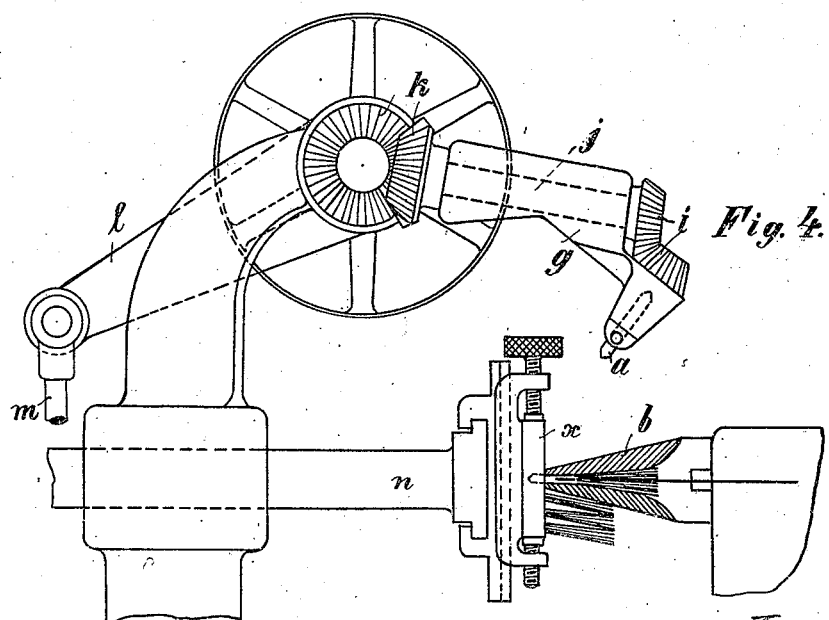

In the boring and stuffing machine shown in Figs. 3 and 4 the support $n$ of the workpiece is moved in a horizontal direction towards the fixed stuffing tool $b$. The boring device is arranged in such a manner that the oscillating arm $g$ is raised when the drill $a$ moves clear of the space for the stuffing tool $b$ or when the workpiece has to be advanced towards the stuffing tool.

In machines for boring and stuffing broomheads the boring device can be made so that it moves in a lateral direction instead of oscillating in an upward direction as described.

I claim:—

1. In a brush boring and bristle setting machine, the combination with a machine frame of a support for the brush back; a boring tool and a stuffing tool; a swinging carrier arm for one of the tools pivoted to the machine frame in the plane of the brush back, said tool adapted to engage the brush back at right angles to its surface when in working position; and said second tool adapted to reciprocate relatively to the brush back support in a line tangential to the arc described by the first-named tool at the point where said first-named tool is adapted to engage the brush back.

2. In a brush boring and bristle setting machine, the combination with a machine frame of a support for the brush back; a boring tool and a stuffing tool; a swinging carrier arm for the boring tool pivoted to the machine frame in the plane of the brush back, said boring tool being adapted to engage the brush back at right angles to its surface; and the second tool adapted to reciprocate relatively to the brush back support in a line tangential to the arc described by the cutting end of the boring tool at the point where the latter is adapted to engage the brush back.

In testimony whereof I affix my signature in presence of two witnesses.

GEORG HENNING.

Witnesses:
 EMIL HAGER,
 PETER LAUER.